F. BADE.
DIAMOND DRILL.
APPLICATION FILED MAY 19, 1911.
1,041,568.
Patented Oct. 15, 1912.
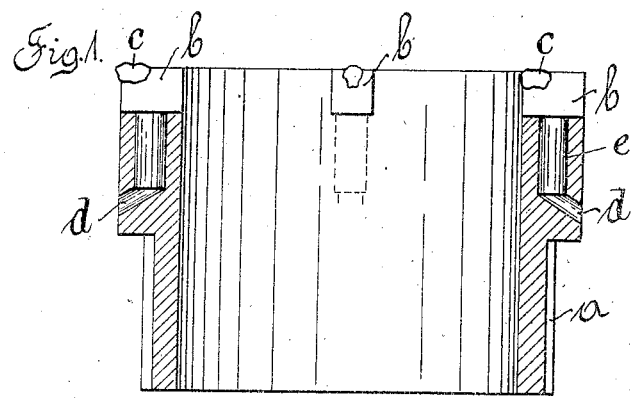
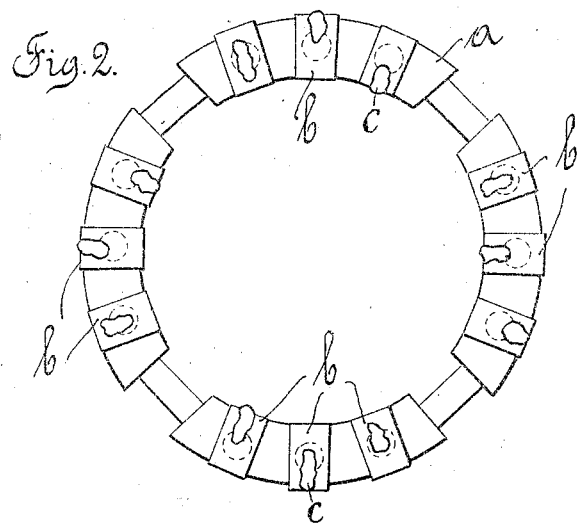
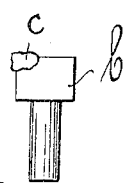 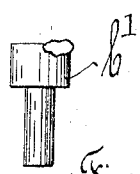 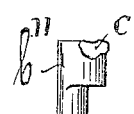
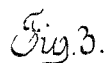
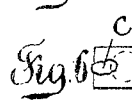 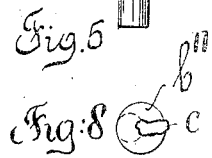
Witnesses:
Inventor: Franz Bade,
By Attorney.

UNITED STATES PATENT OFFICE.

FRANZ BADE, OF PEINE, GERMANY.

DIAMOND DRILL.

1,041,568.  Specification of Letters Patent.  Patented Oct. 15, 1912.

Application filed May 19, 1911. Serial No. 628,282.

*To all whom it may concern:*

Be it known that I, FRANZ BADE, a subject of the German Emperor, residing at Peine, in Germany, have invented certain new and useful Improvements in Diamond Drills, of which the following is a specification.

In working with diamond drills, difficulty frequently arises in connection with the insertion of the diamonds into the drill head; an operation requiring great skill, care and accuracy, in order to adjust the diamonds in proper relation to each other. This is more particularly the case with loose diamonds. It has been proposed to fix the diamonds to disks or the like adapted to be fitted to the drill head, but with the method heretofore adopted for this purpose, special adjustment of the seat of each disk was required, according to the position of the diamond thereon.

The object of the present invention is to enable accurate positioning of the diamonds to be secured by uniform insertion of the several holders, without special adjustment thereof upon their seats.

The invention is illustrated in the accompanying drawing, in which:—

Figure 1 is an axial section of the drill head, and Fig. 2 a plan view thereof. Figs. 3, 4 and 5 are side-views of diamond holders for insertion into the drill head, and Figs. 6, 7 and 8 are corresponding plan-views.

Referring to Figs. 1 and 2, $a$ is the annular drill head, which carries the holders $b$ of the diamonds $c$, the holders being in the form of studs, whereof the shanks fit into holes or sockets $e$ equidistant from the central axis of the drill head. The diameter of each shank is equal to about half the thickness of the drill-head. According to the present invention the studs are so treated, for shaping purposes, that in the case of the several diamonds intended to cut on the same line, external, internal or central, the position of the cutting edge relatively to the stud axis is exactly uniform, and similarly the vertical distance of said cutting edge from the under face of the stud-head, so that when the said studs are inserted into the drill head the diamonds are axially and radially accurately positioned for cutting, without requiring special adjustment.

The studs may be fixed by soldering or other means, and the drill head is provided with lateral passages $d$ enabling the studs to be forced out of the sockets again when they are to be exchanged.

I prefer to use studs of angular outline, as shown in Figs. 2, 3 and 6, inasmuch as such studs can be conveniently secured against rotation by fitting them into notches. I may, however, also use studs of circular shape, as shown in Figs. 4 and 7, wherein the head of the stud $b^1$ is concentric with the shank, or studs with heads eccentric upon the shanks, as in the case of the stud $b^{11}$ shown in Figs. 5 and 8.

What I claim as my invention and desire to secure by Letters Patent of the United States is:—

1. The combination with an annular drill head having a plurality of cylindrical sockets, the axes of which are equidistant from and parallel to the axis of the drill head, a plurality of separate diamond mounts each comprising a cylindrical shank and a head of larger diameter than the shank, and diamonds mounted on the upper face of said mount heads respectively at different predetermined distances with respect to the axis of the mount shanks.

2. The combination with an annular drill head having a plurality of angular recesses terminating in cylindrical sockets, the axes of which are equidistant from and parallel to the axis of the drill head, a plurality of separate diamond mounts each comprising a cylindrical shank and an angular head of larger diameter than the shank, and diamonds mounted on the upper face of said mount heads respectively at different predetermined distances with respect to the axis of the mount shanks.

In witness whereof I have signed this specification in the presence of two witnesses.

FRANZ BADE.

Witnesses:
 CARL SCHURIGER,
 CARL DELIUS.